US010812572B2

(12) United States Patent
Asthana

(10) Patent No.: US 10,812,572 B2
(45) Date of Patent: Oct. 20, 2020

(54) CLOUD-BASED DATA SHARING

(71) Applicant: HEWLETT-PACKARD DEVELOPMENT COMPANY, L.P., Houston, TX (US)

(72) Inventor: Prashant Asthana, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 25 days.

(21) Appl. No.: 16/206,356

(22) Filed: Nov. 30, 2018

(65) Prior Publication Data

US 2019/0098077 A1 Mar. 28, 2019

Related U.S. Application Data

(63) Continuation of application No. 15/035,284, filed as application No. PCT/US2013/072438 on Nov. 28, 2013, now Pat. No. 10,178,159.

(51) Int. Cl.
| | | |
|---|---|---|
| G06F 15/16 | (2006.01) |
| H04L 29/08 | (2006.01) |
| H04W 4/80 | (2018.01) |
| G06F 9/54 | (2006.01) |
| G06F 3/01 | (2006.01) |
| H04L 29/06 | (2006.01) |

(52) U.S. Cl.
CPC .............. *H04L 67/10* (2013.01); *G06F 3/017* (2013.01); *G06F 9/541* (2013.01); *H04L 63/0876* (2013.01); *H04L 67/141* (2013.01); *H04W 4/80* (2018.02)

(58) Field of Classification Search
CPC ... H04L 67/10; H04L 63/0876; H04L 67/141; H04W 4/80; G06F 9/541
See application file for complete search history.

(56) References Cited

U.S. PATENT DOCUMENTS

| | | | |
|---|---|---|---|
| 6,577,599 B1 * | 6/2003 | Gupta | H04L 12/1868 370/236 |
| 7,313,593 B1 | 12/2007 | Pulito et al. | |
| 8,090,842 B2 * | 1/2012 | Schirar | G08C 17/02 455/41.1 |
| 9,749,372 B2 * | 8/2017 | Kwak | H04L 65/4076 |
| 9,978,238 B2 * | 5/2018 | Fadell | G08B 19/005 |
| 9,998,434 B2 * | 6/2018 | Verzun | H04L 9/0662 |

(Continued)

FOREIGN PATENT DOCUMENTS

| | | |
|---|---|---|
| CN | 101925158 | 12/2010 |
| CN | 102739705 | 10/2012 |
| WO | WO-2013/101879 | 7/2013 |

OTHER PUBLICATIONS

"Technology: WPAN Futures—The Blind Leading the Vision Impaired," HarborResearch.com, retrieved from the internet Jan. 23, 2014, http://harborresearch.com/technology-wpan-futures-the-bline-leading-the-vision-impaired.

*Primary Examiner* — Thanh T Nguyen
(74) *Attorney, Agent, or Firm* — HP Inc. Patent Department

(57) ABSTRACT

A first device broadcasts an intent to share data with a second device, using a first communications protocol, The first device connects to a cloud server using a second communications protocol, and shares the data with the second device on the cloud server when the second device is connected to the cloud server.

19 Claims, 5 Drawing Sheets

(56) References Cited

U.S. PATENT DOCUMENTS

| | | | |
|---|---|---|---|
| 10,117,097 B1* | 10/2018 | Kotara | H04W 12/06 |
| 2005/0289264 A1* | 12/2005 | Illowsky | G06F 8/41 |
| | | | 710/104 |
| 2010/0125353 A1* | 5/2010 | Petit-Huguenin | H04L 45/16 |
| | | | 700/94 |
| 2011/0202189 A1* | 8/2011 | Venkatakrishnan | G06Q 50/06 |
| | | | 700/286 |
| 2012/0180098 A1* | 7/2012 | Kim | H04N 21/64322 |
| | | | 725/110 |
| 2012/0185906 A1* | 7/2012 | Doets | H04L 65/1069 |
| | | | 725/109 |
| 2012/0209716 A1* | 8/2012 | Burns | G06Q 30/02 |
| | | | 705/14.64 |
| 2013/0007362 A1 | 1/2013 | Lin et al. | |
| 2013/0036167 A1 | 2/2013 | Bazot et al. | |
| 2013/0073624 A1* | 3/2013 | Nguyen | H04L 12/1822 |
| | | | 709/204 |
| 2013/0103545 A1 | 4/2013 | Szu et al. | |
| 2013/0225080 A1 | 8/2013 | Doss et al. | |
| 2013/0282852 A1* | 10/2013 | Chu | H04L 12/18 |
| | | | 709/213 |
| 2016/0048114 A1* | 2/2016 | Matthieu | H04L 12/2803 |
| | | | 700/83 |
| 2016/0226939 A1* | 8/2016 | Kwak | H04L 12/1881 |
| 2016/0344878 A1* | 11/2016 | Asthana | G06F 3/1226 |
| 2018/0114219 A1* | 4/2018 | Setchell | G06F 21/31 |
| 2018/0295564 A1* | 10/2018 | Madan | G06Q 20/3224 |
| 2019/0377532 A1* | 12/2019 | Garrison | H04N 1/00363 |

\* cited by examiner

CLOUD-BASED DATA SHARING

CROSS-REFERENCE TO RELATED APPLICATIONS

This application is a continuation of a recently allowed U.S. patent application Ser. No. 15/035,284, filed on Nov. 28, 2013, which is herein incorporated by reference in its entirety.

BACKGROUND

Advances in technology have led to the ability to wirelessly transfer data between multiple devices. Prior to the development of wireless data transfer technologies, data transfer between devices could be achieved using wired means or manually collecting data from a logging device, for example.

BRIEF DESCRIPTION OF THE DRAWINGS

Some examples of the present application are described with respect to the following figures.

DETAILED DESCRIPTION

Figure 1:
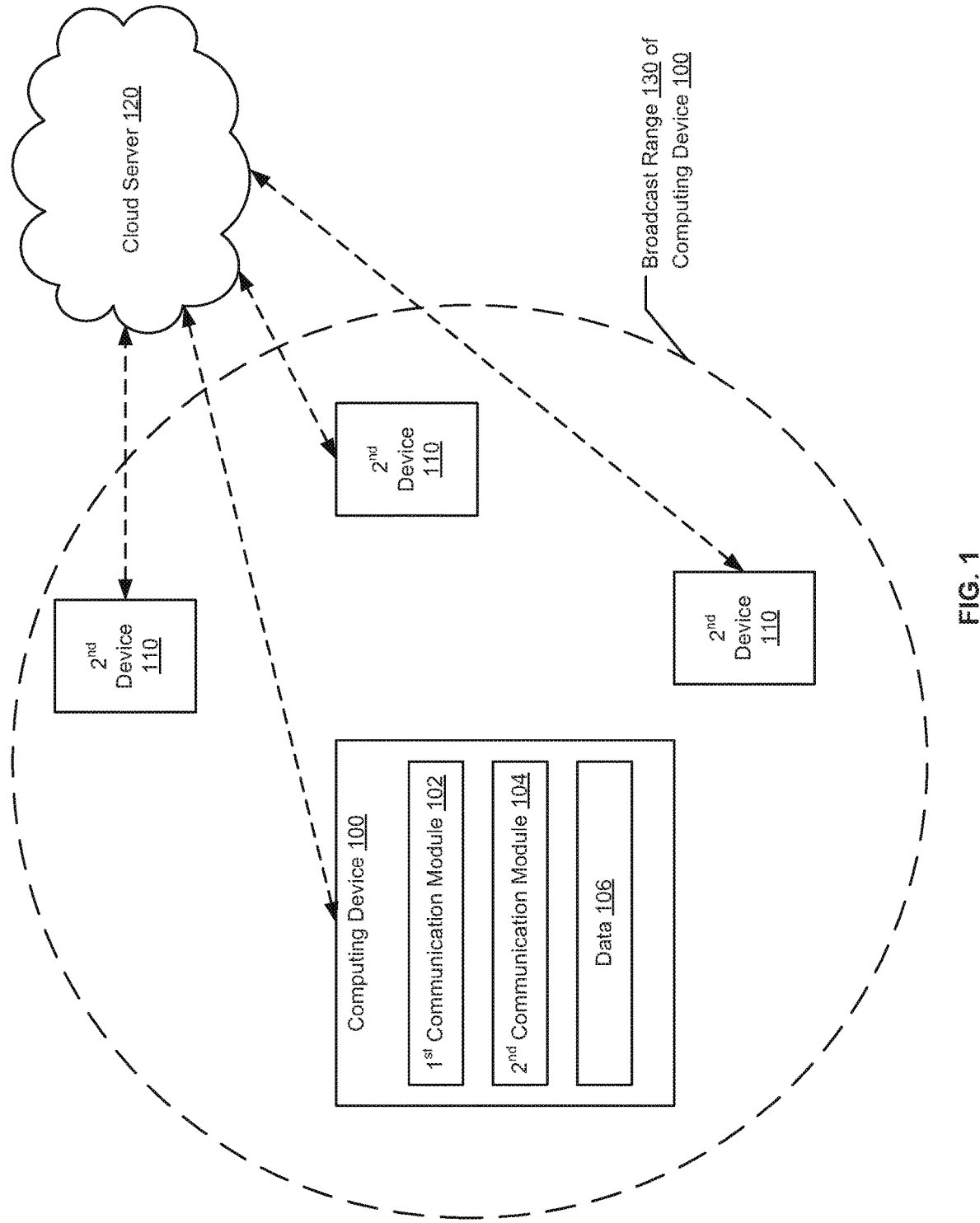
FIG. 1 illustrates an example of a computing device for sharing data with a second devices on a cloud server.

Wireless personal area network (WPAN) is a network for interconnecting devices centered on an individual person's workspace or home, for example. Ad-hoc networking is one of the key concepts of WPANs, whereby devices can be a part of the network temporarily (i.e., join and leave at will). The ease of joining and leaving a network may be desirable to users of mobile devices such as personal digital assistants (PDAs), laptops, tablets, and smartphones.

Wireless technologies for sharing data can be categorized into two broad segments namely: a) high speed protocols such as Wi-Fi, Bluetooth, cellular network, and any broadband communications protocol; and b) low power protocols such as ANT®, Bluetooth low energy (BLE), ZigBee, and infrared data association (IrDA). Thus, a protocol can either deliver high data speed at the cost of increased power consumption, or the protocol can operate on low power but with low data transmission speed. Hence, to provide an effective WPAN for energy conscious devices, it would be beneficial to provide a solution with the following attributes: low manufacturing cost and low power consumption, ad-hoc with little or no setup overhead, secure, and high bandwidth to support high speed data transfer.

As used herein "low-power" protocol is a protocol that provides considerably reduced power consumption and lower cost than a high speed protocol. As used herein "high speed" protocol is a protocol that can deliver high data speed/rate at the cost of more power consumption (e.g., compared to a low-power protocol). As used herein, a "server" is a system including software and hardware that responds to requests across a computer network to provide, or help to provide, a network service. As used herein, a "cloud server" is a logical server that is built, hosted and delivered through a cloud computing platform over the Internet. Cloud servers possess and exhibit similar capabilities and functionality to a typical server but are accessed remotely from a cloud service provider or a cloud computing environment. As used herein, a "communications protocol" is defined as including, but is not necessarily limited to, a format, syntax, rules, and signaling arrangement utilized to transmit/receive data to and from other devices, using one or more "wireless radios."

Examples described herein provide a solution wherein the ultra low power radios work in collaboration with high speed networks like 3G, 4G, long term evolution (LTE), and Wi-Fi to create a high speed ad-hoc WPAN that can support high bandwidth applications like video/audio streaming, large file sharing, real time call conference/forwarding, and so on.

In one example, a method for data sharing includes broadcasting, by a first device, an intent to share data with a second device using a first communications protocol. The method also includes connecting to a cloud server using a second communications protocol, and sharing the data with the second device on the cloud server when the second device is connected to the cloud server.

In another example, a computing device includes a first communications module to broadcast, using a low-power communications protocol, an intent to share data to a second device within a broadcast range of the computing device. The computing device also includes a second communications module to connect to a cloud server using a high-speed communications protocol, and to share the data with the second device on the cloud server.

In another example, a non-transitory computer-readable storage medium includes instructions that if executed cause a controller of a computing device to broadcast an intent to share data using a low-power communications protocol. The instructions cause the controller to connect to a cloud server using a high-speed communications protocol, and share the data with at least one second computing device that responds to the broadcast by connecting to the cloud server.

Referring now to the figures, FIG. 1 is an example of a computing device for sharing data with a second device over a cloud server. Computing device 100 can be a tablet computing device, a smartphone, a PDA, a mobile device, a notebook computing device, or any other mobile computing device that can be used to share data 106 with other devices such as second device 110. Second device 110 can be a mobile computing device like computing device 100 or another device such as a printing device, home appliances (e.g., TV, microwave, etc.), or any other device that can share/exchange data 106 with computing device 100. As used herein, "data" can be any type of content, file, video stream, audio stream, call conferencing, call forwarding, printing, or display sharing.

Cloud server 120 can be a cloud infrastructure for providing cloud services to web-connected client devices such as computing device 100 and second device 110. For example, cloud server 120 may provide services such as email printing, downloadable applications, and cloud registration and management services. In some examples, cloud server 120 represents generally any computing device configured to respond lo network requests from computing device 100 and second device 110. It should be noted that in some examples, a traditional server may be used as an alternative or in addition to the cloud server. Accordingly, cloud server 120 may be any computing device accessible to a plurality of devices over a network such as the Internet.

Computing device 100 includes a first communications module 102 and a second communications module 104. First communications module 102 includes a combination of software and hardware for wirelessly transmitting and receiving data. First communications module 102 may include a wireless radio for communicating wirelessly. First communications module 102 is configured to implement a low-power communications protocol such as a BLE protocol, an ANT protocol, a ZigBee protocol, an IrDA protocol, or a UWB protocol. Accordingly, first communications module 102 may include a low-power radio that corresponds to the low-power protocol implemented.

Second communications module 104 includes a combination of software and hardware for wirelessly transmitting and receiving data. Second communications module 104 may include a wireless radio for communicating wirelessly. Second communications module 104 is configured to implement a high-speed communications protocol such as an Internet protocol, a broadband communications protocol, or a cellular network protocol (e.g., 3G, 4G, LTE, etc.).

When a user of the device 100 desires to share data 106 with a second device 110, an intent to share data 106 is broadcast by the first communications module 102, using the low-power communications protocol. For example, using a low power radio like ANT or BLE, device 100 broadcasts its intent to share data 106. The broadcast is received by a second device 110 that is within a broadcast range 130 of device 100. For example, second device 110 may be in close proximity to device 100. In some examples, first communications module 102 can adjust (i.e., increase or decrease) a signal strength of the broadcast to control the broadcast range 130. In certain examples, the broadcast can be initiated by a user gesture (e.g., user gesture at device 100 towards a direction of second device 110).

Second device 110 in the range 130 of the broadcast connects to the cloud server 120 in response to the broadcast. Device 100 connects to the cloud server 120 using the high-speed communications protocol. For example, using a high-speed radio like Wi-Fi, 3G, 4G, LTE, broadband, or Internet, device 100 connects to cloud server 120. When both device 100 and second device 110, device 100 can share data 106 with second device 110. For example, device 100 can send the data 106 to the cloud server 120, and second device 110 can retrieve the data 106 from the cloud server 120.

Accordingly, the described examples allows the creation of a virtual short-lived (e.g., ad-hoc) solution to share data between devices that may be co-located, using a hybrid of low-power radios and high speed wireless communications. Thus, the described solution can create a high-speed ad-hoc WPAN using low power radios in collaborations with high speed networks (e.g., 3G, 4G, Wi-Fi).

Figure 2:
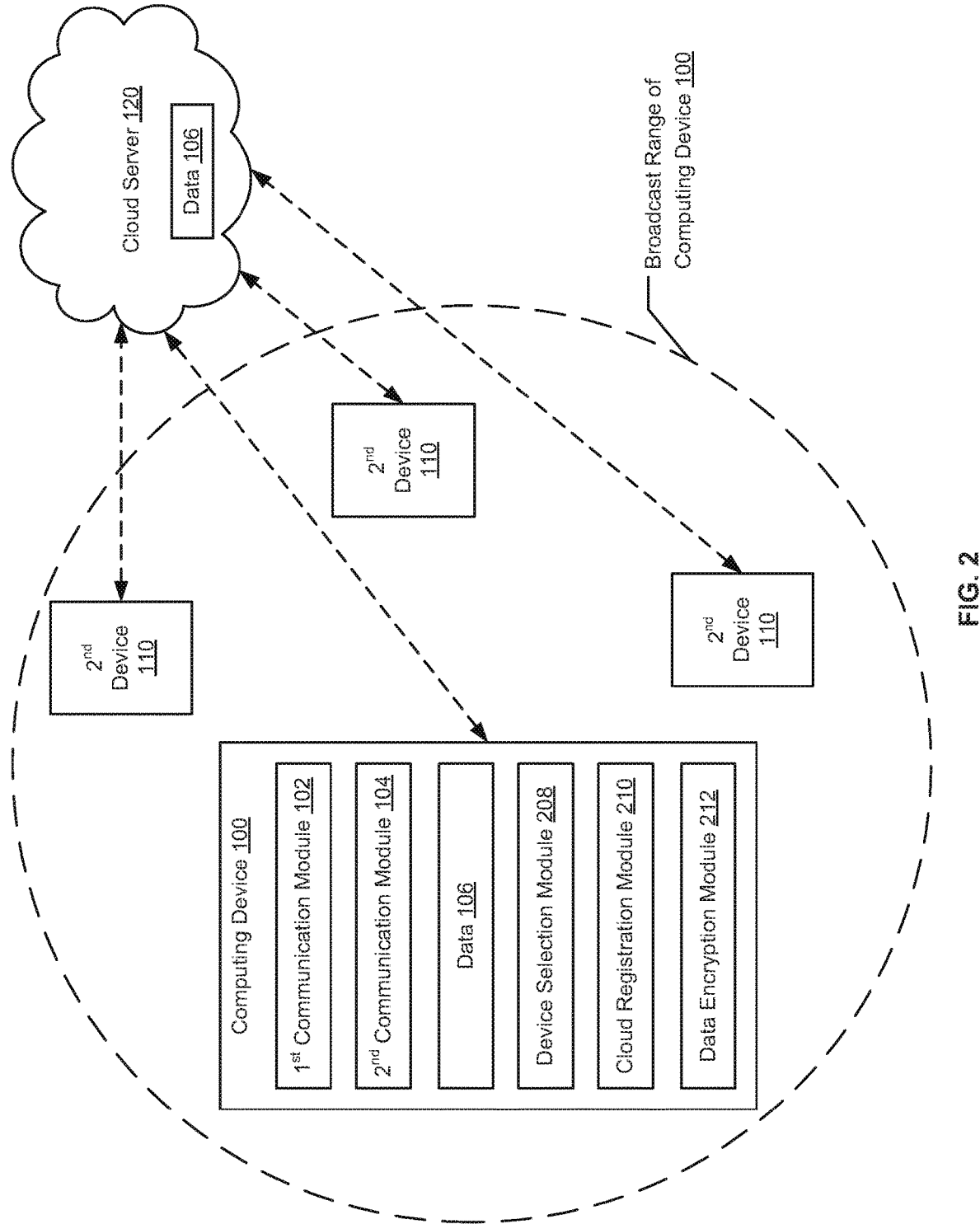
FIG. 2 illustrates another example of a computing device for sharing data with a second device on a cloud server.

FIG. 2 is another example of a computing device for sharing data with a second device over a cloud server. In the example of FIG. 2, computing device 100 includes first communications module 102, second communications module 104, data 106, device selection module 208, cloud registrations module 210, and data encryption module 212.

Prior to broadcasting the intent to share data, cloud registration module 210 registers device 100 with the cloud server 120. For example, device 100 may connect to the cloud server 120 using the second communication module 104 (i.e., high-speed communication), or via hypertext transfer protocol (HTTP) for cloud registration. During cloud registration, cloud server 120 assigns device 100 a unique identification and/or a secure code for authentication. Accordingly, device 100 may present the unique identification and/or secure code when subsequently connecting to the cloud server 120.

Using the first communication module 102, device 100 broadcasts the intent to share data to second devices 110 that are within a broadcast range 130 of the device 100. First communication module 102 can include a low-power wireless radio such as ANT or BLE that utilizes a low-power communication protocol. Further, a user of the device 100 can specify a signal strength of the broadcast to control the coverage area of the broadcast and/or the number of second devices 110 that receive the broadcast. In certain examples, the broadcast includes the unique identification and/or secure code. By including the unique identification and/or secure code, second devices 110 can decode the identification and/or secure code to correctly identify device 100 and sense the intent.

In some examples, data encryption module 212 is configured to encrypt the data 106 using a key, prior to sharing the data with second device 110. The encryption key can include advanced encryption standard (AES) key. In certain examples, the key is included in the broadcast to second device 110. By broadcasting the key to second device 110 prior to sharing the data 106 over the cloud server 120, the cloud server 120 is unaware of the key thereby preventing potential attacks or eavesdropping.

Upon sending the broadcast, device 100 connects to the cloud server 120 using the second communications module 104. Second communications module 104 can include a high-speed wireless radio such as 3G, 4G, Wi-Fi that utilizes a high-speed communications protocol. In response to receiving the broadcast, second device 110 also connects to the cloud server 120.

In certain examples, a plurality of second devices 110 may receive the broadcast and connect to the cloud server 120 in response to the broadcast. The cloud server 120 may identify the second devices 110 that respond to the broadcast, based on the unique identification and/or secure code of the sending device 100, for example, and create a list of the second devices that have connected to the cloud server 120 in response to the broadcast. The list is then sent to the device 100 for selection. For example, the user can select one or more second devices 100 from the list using the device selection module 208, and send the selection to the cloud server 120. Accordingly, device 100 can securely share data 106 with one or more selected second devices 110 (i.e., instantly and simultaneously) on the cloud server 120, without setup overhead like pairing, or without a need to be in the same Wi-Fi network, for example. The selected one or more second devices 110 can decrypt the data 106 using the encryption key included in the broadcast. When the data transfer is complete, device 100 and the one or more selected second devices 110 can disconnect from the cloud server 120. In some examples, sharing of data 106 on the cloud server 120 can be accomplished by a push method, whereby the cloud server 120 fetches the data 106 (e.g., file, print document, etc) from the device 100, and pushes the data 106 to the one or more selected second devices 110.

Figure 3:
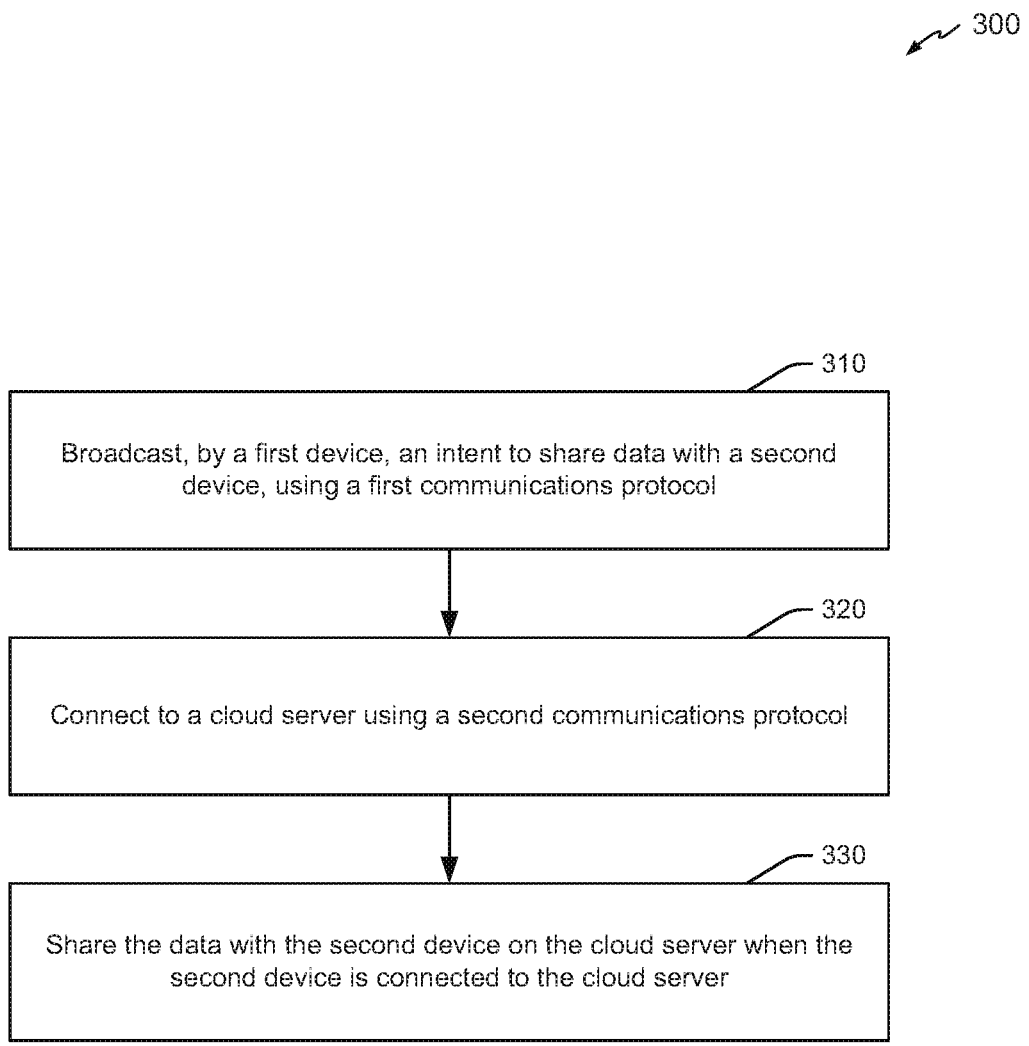
FIG. 3 is an example flowchart illustrating a method for sharing data on a cloud server.

FIG. 3 is an example flowchart illustrating a method for sharing data over a cloud server. Method 300 may be implemented, for example, in the form of executable instructions stored on a non-transitory computer-readable storage medium and/or in the form of electronic circuitry.

Method 300 includes broadcasting, by a first device, an intent to share data with a second device, using a first communications protocol, at 310. For example, device 100 can broadcast an intent to share data 106 to a second device 110, using the first communication module 102 that implements a low-power communications protocol (e.g., BLE, ANT, etc.). Second device 110 can be in a broadcast range 130 of the device 100 or in close proximity of the device 100. In some examples, the broadcast can be initiated by a user gesture in the direction of the second device 110.

Method 300 includes connecting to a cloud server using a second communications protocol, at 320. For example, device 100 can connect to the cloud server 120, using the second communications module 104 that implements a high-speed communications protocol (e.g., 3G, 4G, LTE, Wi-Fi, etc.). Cloud server 120 can be a cloud server with which the device 100 and second device 110 are associated (e.g., device 100 and second device 110 have registered with the cloud server 120).

Method 300 includes sharing the data with the second device on the cloud server when the second device is connected to the cloud server, at 330. For example, second device 110 can connect to the cloud server 120 in response to receiving the broadcast Further, device 100 can connect to the cloud server 120 to share the data 106 with second device 110. In certain examples, the cloud server 120 facilitates sharing of the data 106 between device 100 and second device 110 by patching device 100 with second device 110. In other examples, cloud server 120 fetches the data 106 from device 100 and pushes the data 106 to second device 110. Still in other examples, device 100 can send or store the data 106 and the second device 110 can retrieve the data 106 from the cloud server 120. In some examples, the method 300 of FIG. 3 includes additional steps in addition to and/or in lieu of those depicted in FIG. 3.

Figure 4:
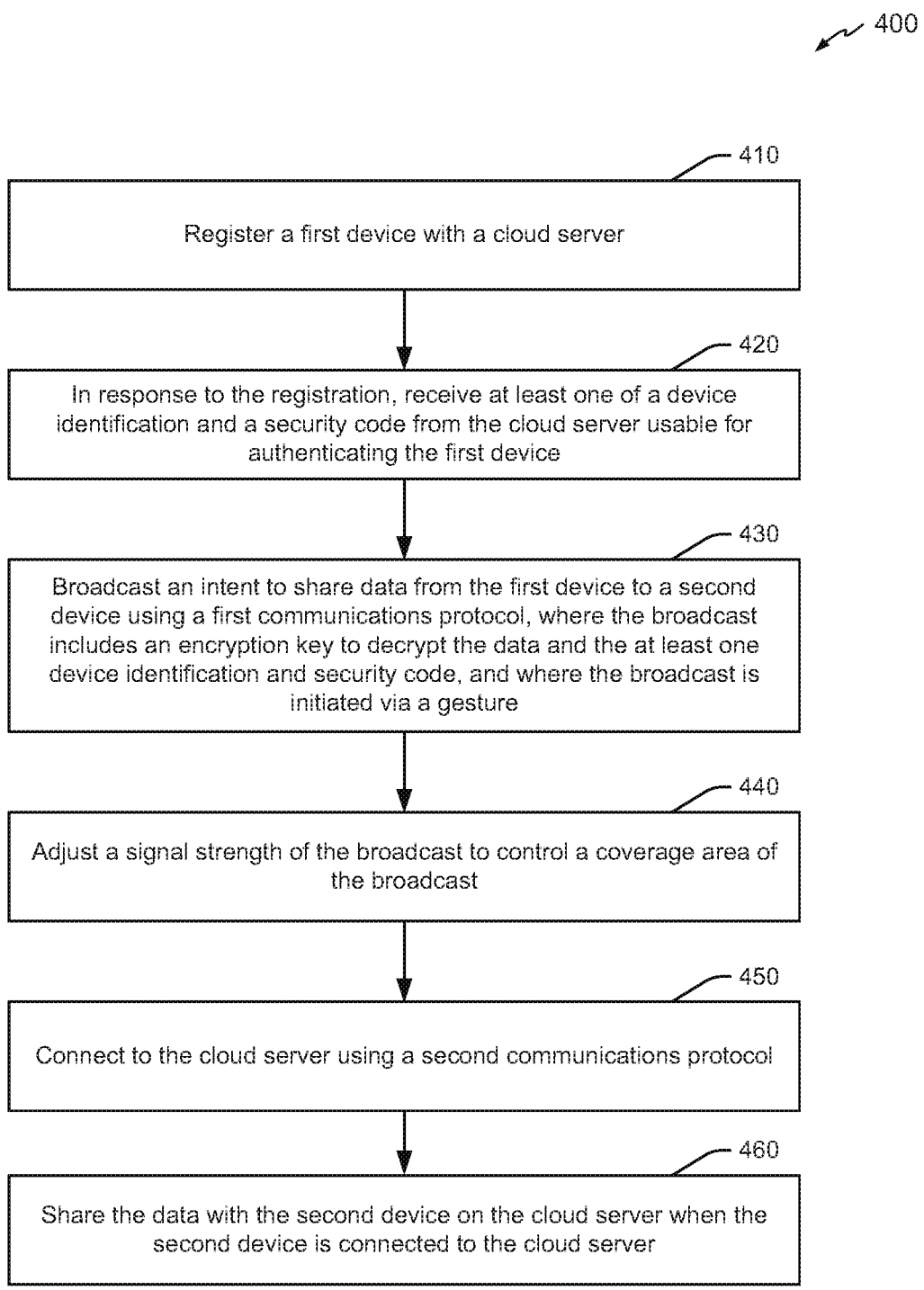
FIG. 4 is another example of a flowchart illustrating a method for sharing data on a cloud server.

FIG. 4 is another example of a flowchart illustrating a method for sharing data over a cloud server. Method 400 may be implemented, for example, in the form of executable instructions stored on a non-transitory computer-readable storage medium and/or in the form of electronic circuitry.

Method 400 includes registering a first device with a cloud server, at 410. For example, device 100 can connect to cloud server 120 for registration to receive cloud services, prior to sending the broadcast. Cloud server 120 can provide a plurality of services to device 100 such as printing services, downloadable applications, storage services, etc. Device 100 can connect to the cloud for registration using a high-speed protocol such as 3G, 4G, LTE, Wi-Fi, for example.

Method 400 includes receiving at least one of a device identification and a security code from the cloud server usable for authentication purposes, in response to the registration, at 420. For example, cloud server 120 can assign a unique identification and/or a secure code to device 100 for authentication and device 100 may need to present the identification and/or secure code when connecting to the cloud server.

Method 400 includes broadcasting an intent to share data from the first device to a second device using a first communications protocol where the broadcast includes an encryption key to decrypt the data, where the broadcast includes the at least one device identification and security code, and where the broadcast is initiated via a gesture, at 430. For example, data encryption module 212 may encrypt the data 106 to be shared over the cloud server 120 with an encryption key. The key (e.g., 128-bit, 192-bit, or 256-bit AES key) may be included in the broadcast to second device 110. The broadcast can be initiated in response to a gesture in a direction of the second device 110 when the data 106 (e.g., content, file, document, etc) is opened at the device 100. Further, the broadcast can be sent using the first communications module 102 of the device 100. The first communication module 102 can be, for example, a low-power wireless radio such as a BLE radio, an ANT radio, or any other low-power radio.

Method 400 includes adjusting a signal strength of the broadcast to control a coverage area of the broadcast, at 440. For example, the user may be provided with a graphical user interface (GUI) to adjust the signal strength of the broadcast to control the coverage area and/or the number of second devices 110 that receive the broadcast.

Method 400 includes connecting to the cloud server using a second communications protocol, at 450. For example, device 100 can connect to the cloud server 120, using the second communications module 104 of the device 100. The second communications module 104 can be, for example, a high-speed wireless radio such as a Wi-Fi radio, a 3G radio, a 4G radio, an LTE radio, or any other high-speed radio.

Method 400 also includes sharing the data with the second device on the cloud server when the second device is connected to the cloud server, at 460. Second devices 110 that receive the broadcast can connect to the cloud server 120. In some examples, the cloud server 120 can send a list of second devices 110 that responded to the broadcast to device 100, and device 100 can select one or more second devices 110 to share the data with. Device 100 can disconnect from the cloud server 120 after data 106 has been shared with the second device 110. In some examples, the method 400 of FIG. 4 includes additional steps in addition to and/or in lieu of those depicted in FIG. 4.

Figure 5:
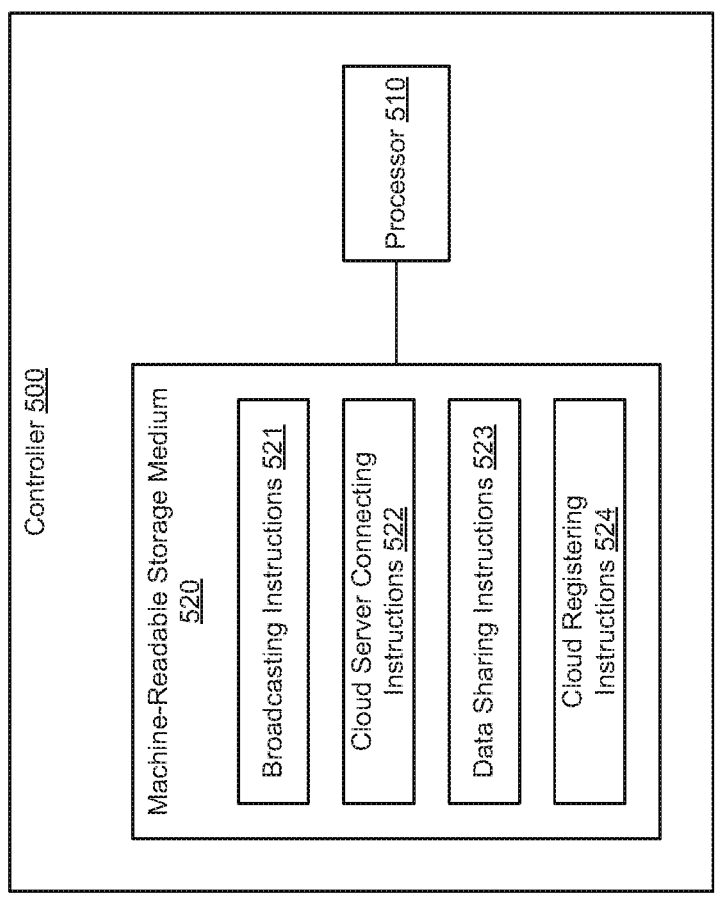
FIG. 5 illustrates an example of a controller including a computer-readable medium having instructions to share data on a cloud server.

FIG. 5 illustrates an example of a controller including a computer-readable medium having instructions to share data over a cloud server. Controller 500 can include a non-transitory computer-readable medium 520. The non-transitory computer-readable medium 520 can include instructions 521-524 that if executed by a processor 510 can cause the controller 500 to perform the functionality described below.

For example, broadcasting instructions 521 are executable to broadcast an intent to share data using a low-power communications protocol. Cloud server connecting instructions 522 are executable to connect to a cloud server using a high-speed communications protocol. Data sharing instructions 523 are executable to share the data with at least one second computing device that responds to the broadcast by connecting to the cloud server. Cloud registering instructions 524 are executable to register the computing device with the cloud server prior to sending the broadcast, receive a device identification and a secure code from the cloud server in response to the registration, where the device identification and secure code are used to connect to the cloud server.

The techniques described above may be embodied in a computer-readable medium for configuring a computing system to execute the method. The computer-readable media may include, for example and without limitation, any number of the following non-transitive mediums: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and obvious types of computer-readable media may be used to store the software modules discussed herein. Computing systems may be found in many forms including but not limited to mainframes, minicomputers, servers, workstations, personal computers, notepads, personal digital assistants, tablets, smartphones, various wireless devices and embedded systems, just to name a few.

In the foregoing description, numerous details are set forth to provide an understanding of the present disclosure. However, it will be understood by those skilled in the art that the present disclosure may be practiced without these details. While the present disclosure has been disclosed with respect to a limited number of examples, those skilled in the art will appreciate numerous modifications and variations therefrom. It is intended that the appended claims cover such modifications and variations as fall within the true spirit and scope of the present disclosure.

The invention claimed is:

1. A method for data sharing, comprising:
    receiving, by a second device, an intent to share data that is broadcasted from a first device using a low-power communications protocol when the second device is within a broadcast range of the first communication protocol, wherein the intent to share data is registered with a cloud server prior to being broadcasted, wherein the intent to share data that is broadcasted includes an encryption key, wherein the data is encrypted using the encryption key, and wherein the encryption key is used by the second device to decrypt the data received from the cloud server;
    connecting to a cloud server using a high-speed communications protocol and at least one of a device identification and a security code in response to the intent to share data that is received, wherein the at least one of the device identification and the security code is transmitted to the first device from the cloud server to authenticate the first device; and
    receiving data from the cloud server, wherein the data is shared on the cloud server by the first device using the high-speed communications protocol.

2. The method of claim 1, wherein the second device comprises a printing device.

3. The method of claim 2, further comprising:
    printing the data that is received from the cloud server.

4. The method of claim 1, wherein the first device comprises a computing device.

5. The method of claim 1, wherein the data comprises a content or a file to be printed.

6. The method of claim 1, wherein the low-power communications protocol comprises at least one of: Bluetooth low energy (BLE) protocol, an ANT® protocol, a ZigBee protocol, an infrared data association (IrDA) protocol, or an ultra-wideband (UWB) protocol.

7. The method of claim 1, wherein the high-speed communications protocol comprises at least one of: an Internet protocol, a broadband communications protocol, and a cellular network protocol.

8. The method of claim 1, wherein the intent to share data that is broadcasted includes at least one of the device identification or the security code.

9. The method of claim 1, wherein the first device initiates a broadcast of the intent to share data using a gesture, wherein the gesture includes pointing the first device in a direction of the second device.

10. A printing device, comprising:
    a processor; and
    a non-transitory computer readable storage medium comprising instructions that are executable by the processor, the instructions comprising:
        instructions to receive an intent to share data that is broadcasted from a first device using a low-power communications protocol when the printing device is within a broadcast range of the first communication protocol, wherein the intent to share data is registered with a cloud server prior to being broadcasted, wherein the intent to share data that is broadcasted includes an encryption key, wherein the data is encrypted using the encryption key, and wherein the encryption key is used by the second device to decrypt the data received from the cloud server;
        instructions to connect to a cloud server using a high-speed communications protocol and at least one of a device identification and a security code in response to the intent to share data that is received, wherein the at least one of the device identification and the security code is transmitted to the first device from the cloud server to authenticate the first device; and
        instructions to receive data from the cloud server, wherein the data is shared on the cloud server by the first device using the high-speed communications protocol.

11. The printing device of claim 10, wherein the data comprises a content or a file.

12. The printing device of claim 11, the instructions further comprising:
    instructions to print the content or the file.

13. The printing device of claim 10, wherein the data is pushed to the printing device from the cloud server based on a selection of the printing device made by the first device.

14. The printing device of claim 13, wherein the printing device is selected by the first device from a drop down list generated by the cloud server based on a plurality of second devices that are connected to the cloud server in response to the intent to share data that is broadcasted by the first device.

15. A non-transitory computer-readable storage medium comprising instructions that when executed cause a controller of a printing device to:
    receive an intent to share data that is broadcasted from a first device using a low-power communications protocol when the printing device is within a broadcast range of the first communication protocol, wherein the intent to share data is registered with a cloud server prior to being broadcasted, wherein the intent to share data that is broadcasted includes an encryption key, wherein the data is encrypted using the encryption key, and wherein the encryption key is used by the second device to decrypt the data received from the cloud server;
    connect to a cloud server using a high-speed communications protocol and at least one of a device identification and a security code in response to the intent to share data that is received, wherein the at least one of the device identification and the security code is transmitted to the first device from the cloud server to authenticate the first device; and
    receive data from the cloud server, wherein the data is shared on the cloud server by the first device using the high-speed communications protocol.

16. The non-transitory computer readable storage medium of claim 15, wherein the low-power communications protocol comprises at least one of: Bluetooth low energy (BLE) protocol, an ANT® protocol, a ZigBee protocol, an infrared data association (IrDA) protocol, or an ultra-wideband (UWB) protocol.

17. The non-transitory computer readable storage medium of claim 15, wherein the high-speed communications protocol comprises at least one of: an Internet protocol, a broadband communications protocol, and a cellular network protocol.

18. The non-transitory computer readable storage medium of claim 15, wherein the intent to share data that is broadcasted includes at least one of a device identification or a security code in the intent to share data that is broadcasted.

19. The non-transitory computer readable storage medium of claim 15, wherein the first device initiates a broadcast of the intent to share data using a gesture, wherein the gesture includes pointing the first device in a direction of the second device.

* * * * *